United States Patent
Gosis et al.

(10) Patent No.: US 8,459,296 B2
(45) Date of Patent: Jun. 11, 2013

(54) AIRCRAFT HOSE RETRIEVAL SYSTEM

(75) Inventors: Anatoly Gosis, Palatine, IL (US); Folkert Fred Koch, San Ramon, CA (US); Frank Otte, Mount Prospect, IL (US)

(73) Assignee: Illinois Tool Works, Glenview, IL (US)

( * ) Notice: Subject to any disclaimer, the term of this patent is extended or adjusted under 35 U.S.C. 154(b) by 351 days.

(21) Appl. No.: 12/860,579

(22) Filed: Aug. 20, 2010

(65) Prior Publication Data

US 2012/0042979 A1 Feb. 23, 2012

(51) Int. Cl.
*A62C 35/00* (2006.01)

(52) U.S. Cl.
USPC .................. 137/355.2; 137/355.16; 226/162

(58) Field of Classification Search
USPC . 137/355.2, 355.16, 899.2; 62/DIG. 5; 226/8, 226/162, 163
See application file for complete search history.

(56) References Cited

U.S. PATENT DOCUMENTS

| | | | |
|---|---|---|---|
| 2,603,854 A * | 7/1952 | Gavurin | ........................ 72/185 |
| 3,399,545 A | 9/1968 | Anderson et al. | |
| 4,860,498 A | 8/1989 | Gosis | |
| 5,023,959 A | 6/1991 | Mercer | |
| 6,776,705 B2 * | 8/2004 | Bombardi et al. | ............ 454/119 |
| 6,821,201 B2 | 11/2004 | Bombardi et al. | |
| 6,834,668 B2 | 12/2004 | Bombardi et al. | |
| 7,140,533 B2 | 11/2006 | Gosis et al. | |
| 7,152,886 B2 | 12/2006 | Janis et al. | |
| 7,237,478 B1 | 7/2007 | Gosis et al. | |
| 7,251,879 B2 | 8/2007 | Gosis et al. | |
| 7,296,728 B2 | 11/2007 | Gosis et al. | |
| 7,370,398 B2 | 5/2008 | Gosis et al. | |
| 7,380,680 B2 | 6/2008 | Kosmyna et al. | |
| 7,572,981 B2 | 8/2009 | Koizumi et al. | |
| 2004/0209565 A1 | 10/2004 | Bombardi et al. | |
| 2005/0040215 A1 | 2/2005 | Gosis et al. | |
| 2007/0039167 A1 | 2/2007 | Gosis et al. | |
| 2007/0063009 A1 | 3/2007 | Gosis et al. | |
| 2007/0063010 A1 | 3/2007 | Gosis et al. | |
| 2007/0158348 A1 | 7/2007 | Kosmyna et al. | |
| 2007/0200343 A1 | 8/2007 | Janis et al. | |
| 2007/0215227 A1 | 9/2007 | Gosis et al. | |
| 2007/0215228 A1 | 9/2007 | Gosis et al. | |
| 2007/0216155 A1 | 9/2007 | Gosis et al. | |
| 2008/0054631 A1 | 3/2008 | Gosis et al. | |
| 2009/0032652 A1 | 2/2009 | Gosis et al. | |
| 2010/0029123 A1 | 2/2010 | Gosis et al. | |

FOREIGN PATENT DOCUMENTS

GB 2308840 9/1997

* cited by examiner

*Primary Examiner* — John Rivell
*Assistant Examiner* — Kevin E Lynn
(74) *Attorney, Agent, or Firm* — Fletcher Yoder P.C.

(57) ABSTRACT

The present embodiments are directed towards the transfer, retrieval and storage of flexible materials. In one embodiment, a system is provided that generally includes a hose retrieval system having a first hose gripper assembly. The first hose gripper assembly includes a pair of first grippers configured to move between a first open position and a first closed position in opposite crosswise directions relative to a longitudinal axis of a hose. Each first gripper includes a first L-shaped structure, and the first L-shaped structures are configured to overlap one another to define a first bending gap in the first closed position.

20 Claims, 5 Drawing Sheets

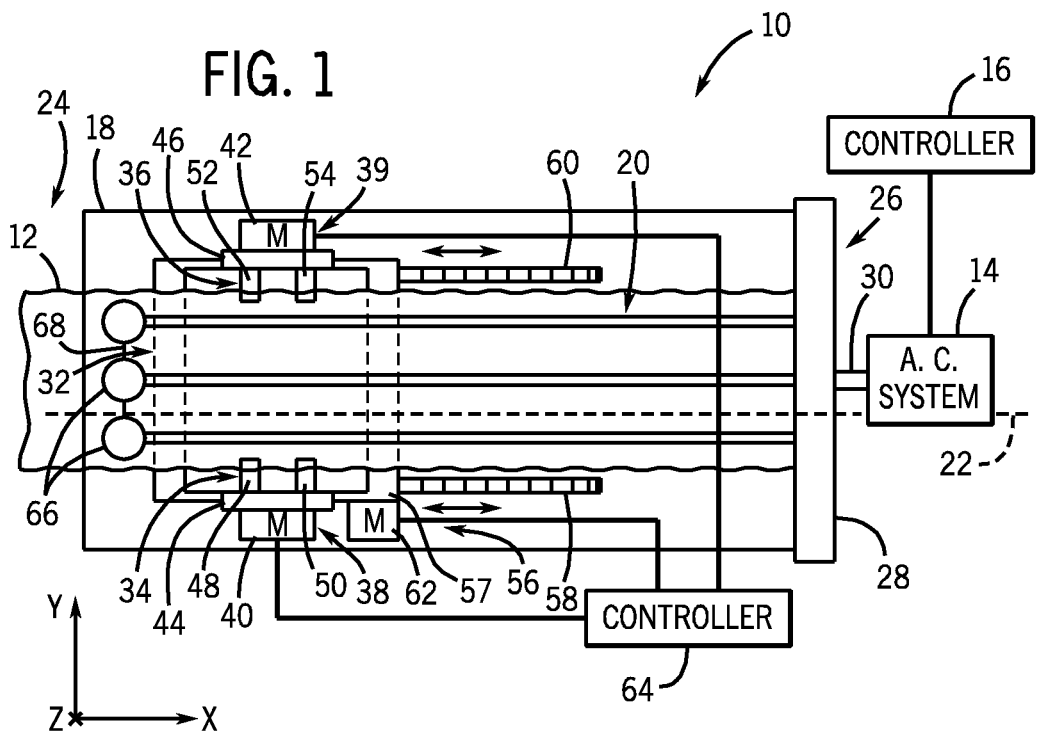
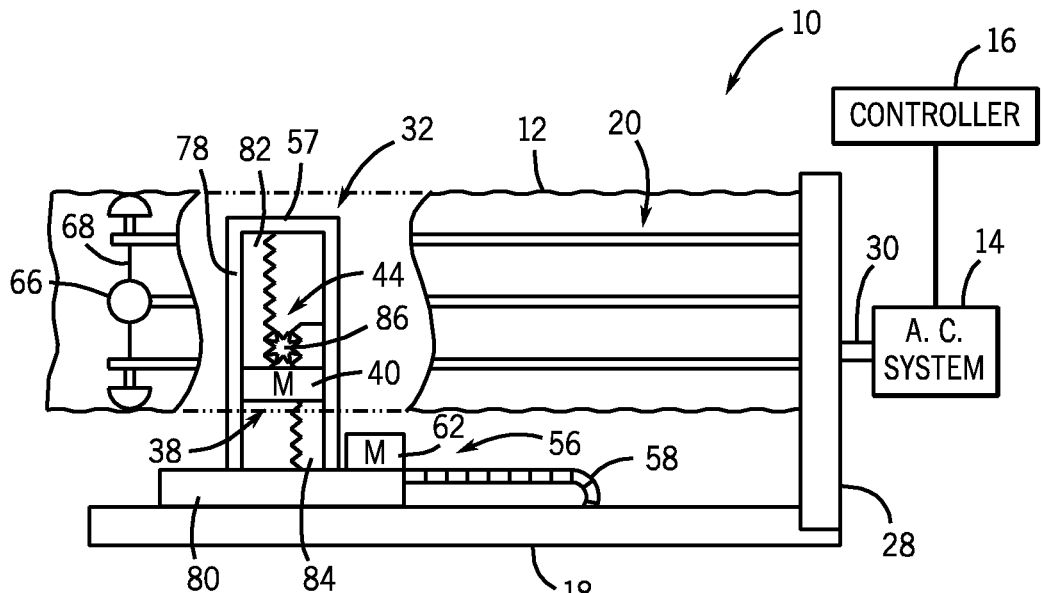

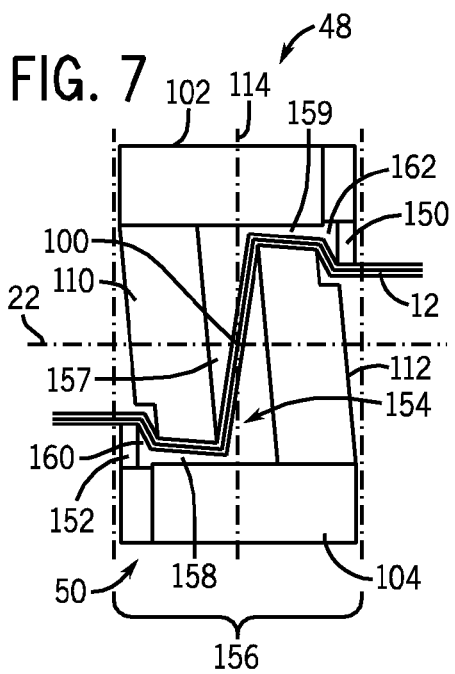
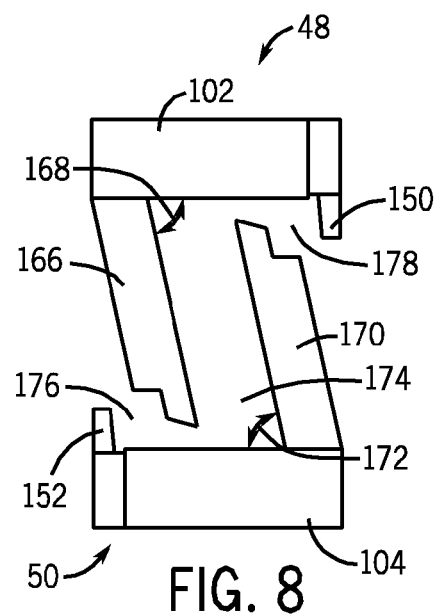
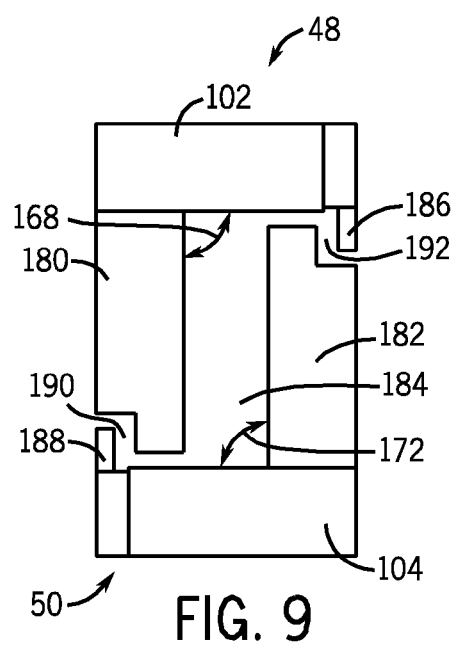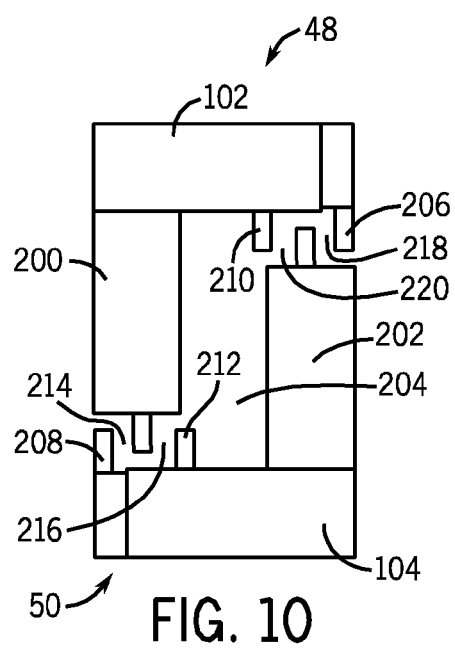

AIRCRAFT HOSE RETRIEVAL SYSTEM

BACKGROUND

The invention relates generally to the transfer, retrieval and storage of flexible materials. More specifically, the disclosed embodiments relate to a device for the retrieval of a flexible conduit that supplies preconditioned air to an aircraft.

While an aircraft is in flight, various subsystems within the aircraft maintain a comfortable cabin environment. For example, these subsystems provide electricity, maintain cabin pressure, and control the circulation and temperature of air within the cabin. However, these subsystems are at least partially deactivated while the aircraft is parked on the ground, e.g., at an airport terminal. During this time, a preconditioned air (PCA) system may be connected to the aircraft to provide PCA to the cabin. For example, the PCA system may include a flexible conduit that may extend a considerable distance to the aircraft. In an airport, the flexible conduit is repeatedly connected and disconnected from various aircraft. As a result, it would be desirable to improve the handling of the flexible conduit to decrease the time and complexity involved with deploying and retrieving the flexible conduit.

BRIEF DESCRIPTION

In one embodiment, a system is provided generally including an aircraft hose retrieval system. The aircraft hose retrieval system generally includes a frame having a longitudinal axis and a first hose gripper assembly. The first hose gripper assembly has a first gripper having a first base and a first primary protrusion, and a second gripper having a second base and a second primary protrusion. The first and second grippers are configured to move in opposite crosswise directions relative to the longitudinal axis, the first primary protrusion extends from the first base toward the second base, the second primary protrusion extends from the second base toward the first base, the first and second primary protrusions are offset from one another along the longitudinal axis, and the first and second primary protrusions are configured to overlap one another to bend and capture a first portion of an aircraft hose.

In another embodiment, a system is provided generally including a fabric hose retrieval system. The fabric hose retrieval system generally includes a fabric hose extending along a longitudinal axis and a first hose gripper assembly disposed on a first side of the fabric hose. The first hose gripper assembly includes a pair of first grippers at least partially offset from one another along the longitudinal axis, and the first grippers are configured to move crosswise relative to the longitudinal axis between a first open position and a first closed position. The first grippers overlap one another to define a first bending gap in the first closed position.

In a further embodiment, a system is provided that generally includes a hose retrieval system having a first hose gripper assembly. The first hose gripper assembly includes a pair of first grippers configured to move between a first open position and a first closed position in opposite crosswise directions relative to a longitudinal axis of a hose. Each first gripper includes a first L-shaped structure, and the first L-shaped structures are configured to overlap one another to define a first bending gap in the first closed position.

DRAWINGS

These and other features, aspects, and advantages of the present invention will become better understood when the following detailed description is read with reference to the accompanying drawings in which like characters represent like parts throughout the drawings, wherein:

FIG. 1 is a top view of an embodiment of a hose retrieval system configured to grab, retrieve, and store a flexible hose with hose gripper assemblies on opposite sides of the flexible hose, illustrating longitudinally offset grippers configured to twist material of the flexible hose;

FIG. 2 is a side view of an embodiment of the hose retrieval system of FIG. 1, illustrating one of the hose gripper assemblies driven by a motor coupled to a rack and pinion assembly;

FIG. 7 is a partial schematic side view of an embodiment of a hose gripper assembly with offset protrusions disposed about material of a flexible hose, illustrating a twisted portion of the material in a gap between the protrusions;

FIG. 8 is a partial schematic side view of an embodiment of a hose gripper assembly, illustrating primary protrusions and auxiliary protrusions at different angles;

FIG. 9 is a partial schematic side view of an embodiment of a hose gripper assembly, illustrating the primary protrusions and the auxiliary protrusions at an angle of approximately 90 degrees;

FIG. 10 is a partial schematic side view of an embodiment of a hose gripper assembly, illustrating alternating auxiliary protrusions.

DETAILED DESCRIPTION

Figure 3:
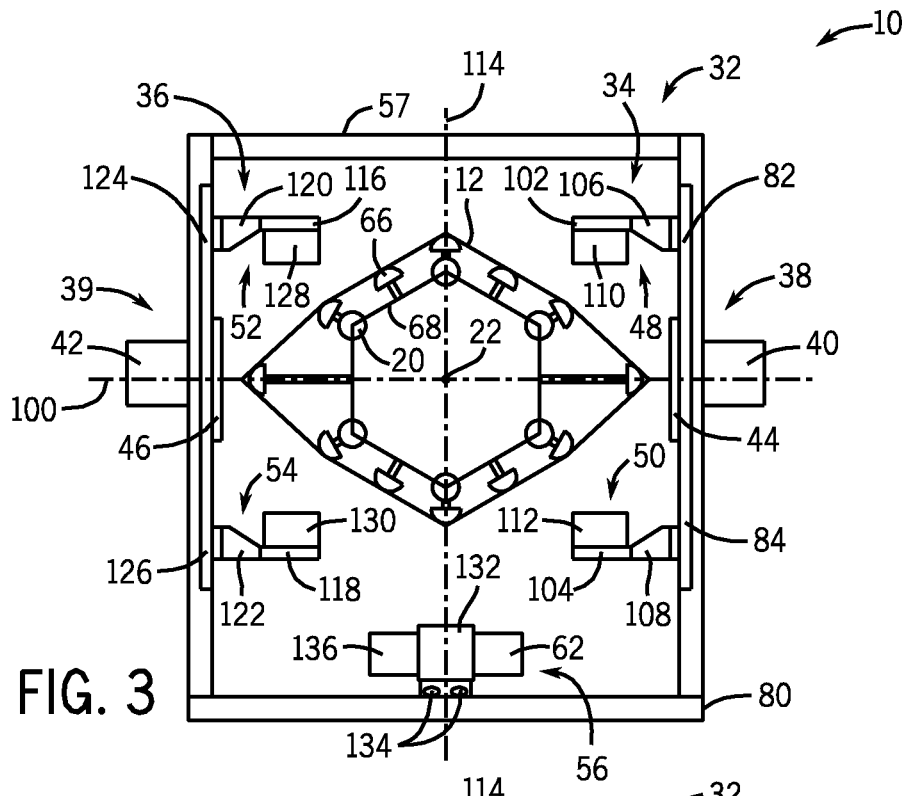
FIG. 3 is a front view of an embodiment of the hose retrieval system of FIGS. 1 and 2, illustrating the grippers in an open position relative to one another.

The disclosed embodiments are directed towards a hose retrieval system that is able to retract and store a flexible hose by providing a series of offset grippers configured to bend the flexible hose at different sections, thereby creating a frictional force that is used to hold the hose during movement along its longitudinal axis. Therefore, during use, the retrieval system captures the hose and moves the hose in a horizontal fashion. In particular, to capture the hose, the disclosed embodiments may grab the hose while maintaining an offset, gap, or clearance between the grippers to avoid any direct compression of the flexible hose. In other words, in some embodiments, the grippers include protrusions that move with a scissor-like motion, such that the protrusions selectively overlap one another with a gap crosswise to the longitudinal axis. The crosswise gap turns or twists the material of the flexible hose in a manner that binds the flexible hose without compression. The flexible hose is thereby captured and retrieved, transferred, and/or compacted by the hose retrieval system for storage. The methods and devices provided herein may also perform these tasks while enabling repeated use (e.g., securing, extension, retraction, and storage) of the flexible hose over multiple uses while preventing damage to the hose due to excessive compression forces, inadvertent snagging in moveable parts such as tracks, and punctures and/or tears as a result of tooth-like gripping mechanisms.

The present approaches may be further appreciated with reference to the drawings and, more specifically, to FIG. 1, which is a top view illustration of a hose retrieval system 10. In a general sense, the hose retrieval system 10 is configured to support, secure, retrieve, and store a flexible hose 12, such as an aircraft hose that is configured to flow preconditioned air (PCA). In use, the hose retrieval system secures the flexible hose 12, for example via a gripping mechanism, and retrieves the flexible hose 12. The retrieval of the flexible hose 12 generally includes the acts of gripping and/or securing the hose 12 and moving the hose 12 in a horizontal motion along a length of the hose retrieval system 10. During operation of the system 10, the flexible hose 12 may be filled with the PCA by an air conditioning (A/C) system 14, which is controlled externally by a human operator and/or a controller 16. As an example, the flexible hose 12 may be attached to an aircraft to supply the PCA to the aircraft while its internal support systems are not being utilized. The controller 16 may utilize set points to determine flow rates, air temperature, and so forth of the PCA supplied to the aircraft.

The hose retrieval system 10 allows these tasks to be performed while supporting the flexible hose 12 within an open-air frame 18, which may include a series of supportive beams or other supportive structures. In other words, the flexible hose 12 is not disposed within a housing, but rather the open-air frame 18 holds the flexible hose 12 open to the environment. This open-air feature of the system 10 enables easy access, viewing, and service by operators, technicians, and so forth to maintain the proper working of the hose retrieval system 10. In certain embodiments, the hose retrieval system 10 may include a plurality of shields that are in place simply to prevent damage to the electrical and/or mechanical parts; such as tracks, motors, and controllers. For example, the system 10 may includes shields below the flexible hose 12 to protect various equipment. The system 10 also may include shields around the gripper assemblies on opposite sides of the flexible hose 12. In some configurations, the shields may extend down the path of horizontal motion. However, the flexible hose 12 remains exposed to the environment. The flexible hose 12 is supported by a series of cantilevered rods 20 that extend along a longitudinal axis 22 from an aircraft side 24 of the hose 12 to the area from which the PCA originates 26. The cantilevered rods 20 are supported by a rear face 28 (e.g., a vertical support wall) proximate the area 26 that also allows the flexible hose 12 to interface with the A/C system 14, for example via one or more ducts 30. After the PCA has been supplied to the aircraft, the flexible hose 12 is retracted towards the rear face 28 for storage.

To perform the retraction of the hose 12, the hose retrieval system 10 includes a hose retrieval mechanism 32 having at least one hose gripper assembly. In the illustrated embodiment, the hose retrieval mechanism 32 includes a first 34 and a second 36 hose gripper assembly disposed on opposite sides crosswise in relation to the longitudinal axis 22 of the hose 12. Each hose gripper assembly 34, 36 generally includes a respective gripper drive assembly 38, 39 having respective first and second motors 40, 42 that drive respective first and second rack and pinion gear systems 44, 46. Each rack and pinion gear system 44, 46 is coupled to their respective first and second gripper assembly 34, 36. More specifically, the first rack and pinion gear system 44 is coupled to first and second grippers 48, 50 and the second rack and pinion gear system 46 is coupled to third and fourth grippers 52, 54. In this regard, it should be noted that the rack and pinion gear systems 44, 46 are presented as examples for providing crosswise movement of the gripper assemblies 34, 36. As such, other mechanisms for providing such movement are also contemplated, such as hydraulic motors, compressed air drives, or any such means for generating an up-and-down movement.

In a general sense, the first and second grippers 48, 50 move in opposite crosswise directions relative to each other and are offset with respect to the longitudinal axis 22, such that when they overlap, a different portion of the flexible hose 12 is addressed by the grippers 48, 50. This allows the hose to interweave within the first gripper assembly 34. In other words, the first and second grippers 48, 50 bend and capture the flexible hose 12 for transfer. The third and fourth grippers 52, 54 perform a similar operation at the other side of the flexible hose 12. This interaction between grippers 48, 50 and 52, 54 may be described as a scissor-like action due to the overlapping of protrusions between the grippers. However, the grippers 48, 50 and 52, 54 are offset from one another to leave an intermediate gap to avoid any direct shearing, while enabling a twisting or interweaving of the material of the hose 12 within the gap. This interweaving creates at least a frictional force that allows the hose 12 to be transferred by the hose retrieval mechanism 32 along the longitudinal axis 22. Indeed, any mechanism that is capable of producing such frictional forces via a gripping mechanism for horizontal movement is contemplated herein.

In the illustrated embodiment, the first and second hose gripper assemblies 34, 36 are driven along the longitudinal axis 22 by a hose retrieval drive assembly 56. The hose retrieval drive assembly 56 includes a retrieval mechanism frame 57 that is moveably mounted to the frame 18 and allows the first and second hose gripper assemblies 34, 36 to move in concert along the longitudinal axis 22, for example a distance between about 1 and 20 feet (e.g., about 1, 2, 3, 4, 5, 6, 7, 8, 9, 10 feet or more). The hose retrieval drive assembly 56 also includes first and second driving tracks 58, 60, which allow the retrieval mechanism frame 57 to move along the longitudinal axis 22. A motor 62 of the hose retrieval drive assembly 56 motivates the retrieval mechanism frame 57 along with the tracks 58, 60 in a back-and-forth manner to allow the first and second gripper assemblies 34, 36 to retrieval portions of the flexible hose 12 from the aircraft side 24 of the system 10 to the PCA origin side 26 of the system 10 (i.e., towards the rear face 28). A controller 64 may control the motor 62 of the hose retrieval drive assembly 56 as well as the first and second motors 40, 42 of the first and second gripper drive assemblies 38, 39. In this way, the controller 64 may control the back-and-forth movement of the retrieval mechanism frame 57 as well as the up-and-down movement of the first, second, third, and fourth grippers 48, 50, 52, and 54 in a substantially automatic fashion. Additionally or alternatively, the controller 64 may perform some or all of the control functions as a result of user input, for example via a user interface attached to the controller 64 or from a wireless control device associated or paired with the controller 64.

In operation, the controller 64 directs the first, second, third, and fourth grippers 48, 50, 52, and 54 to bend and capture a portion of the flexible hose 12. The controller then directs the retrieval mechanism frame 57 to move towards the rear face 28 of the system 10. The backwards motion of the frame 57 and captured portion of the flexible hose 12 causes the hose 12 to move along the rods 20 and a new portion of the flexible hose 12 to be pulled over the series of rods 20. A series of friction-reducing bearings 66 are disposed at or near the ends of the rods 20 to allow the free movement of the flexible hose 12 along the rods 20. For example, the bearings 66 may include oval, spherical, semi-spherical, cylindrical, or dome-shaped structures. Further, the rods 20 may be connected at the aircraft end 24 of the system 10 by a series of elongate connectors 68, which may allow additional friction-reducing bearings to be disposed at the aircraft end 24. In certain embodiments, the connectors 68 extend circumferentially around the axis 22 to connect the rods 20 only at the peripheral end of the rods 20. In other embodiments, the connectors 68 may be in the form of elongate spacers extending between the rods 20 and at least partially along the length of the rods 20. The spacers may be connected to all or a portion of each of the rods 20, such that a gap may be left between each spacer and each of the rods. This gap may allow air to vent to within the annular area defined by the rods 20. Such venting may reduce the resistance to bending, capturing, and translational movement as the flexible hose 12 becomes compacted. In either case, the rods 20 are configured to provide structural support (e.g., beams) at a reduced weight as compared to a single large tube. For example, the rods 20 may be constructed with high strength materials (e.g., steel or aluminum), while the connectors 68 may be made with low strength, light weight materials (e.g., sheet metal, plexiglass, fiber glass, and so forth). Thus, in one embodiment, the connectors 68 may simply facilitate compaction of the hose 12.

After the captured portion of the flexible hose 12 is transferred towards the rear face 28, the controller 64 then directs the grippers 48, 50, 52, and 54 to return to their original open position, which causes the grippers 48, 50, 52, and 54 to release the flexible hose 12. The controller 64 then directs the retrieval mechanism frame 57 to move back towards the aircraft end 24 to capture the newly pulled portion of the flexible hose 12 in a horizontal motion. As noted above, in some embodiments, the horizontal back-and-forth motion of the grippers 48, 50, 52, and 54 may be between about 1 and 20 feet, such as about 1 foot, 2, 3, 4, 5, 6, 7, 8, 9, 10, 11, 12 feet or more. The capture and retrieval process is repeated until a desired amount of flexible hose 12 has been captured and stored. Further, it should be noted that the capture and retrieval process may also compact the flexible hose 12, such that the length of the flexible hose 12 may be stored in compacted form wherein its length is substantially shortened. For example, the flexible hose 12 may be any length, such as between about 20 feet and about 120 feet (e.g., about 20, 30, 40, 50, 60, 70, 80, 90, 100, 110, or 120 feet), and may be retrieved and shortened to a length of about 50 feet, 40 feet, 30 feet, 20 feet, 15 feet, or 10 feet (e.g., shortened by about 50%, 60%, 70%, 80%, 90% or more). The flexible hose 12 remains on the rods 20 in a compacted state during storage.

The gripping, releasing, and translational movement of the grippers 48, 50, 52, and 54 caused by the drive assemblies 38 and 56 may be further appreciated with respect to FIG. 2, which is a side view illustration of the hose retrieval system 10. It should be noted that a portion of the system 10 and hose 12 have been removed for clarity. FIG. 2 depicts the first gripper drive assembly 38 as being supported by a leg 78 extending from a base 80 of the retrieval mechanism frame 57. The first gripper drive assembly 38 is illustrated as including the first rack and pinion gear system 44 and the first motor 40. The first rack and pinion gear system 44 includes a first rack 82 that is coupled to the first gripper 48 depicted in FIG. 1 and a second rack 84 that is coupled to the second gripper 50 depicted in FIG. 1.

The first and second racks 82, 84 are drivingly coupled to a pinion 86. The first and second racks 82, 84 and the pinion 86 have matching gear notches that allow rotational motion of the pinion 86 caused by the motor 40 to be translated into linear motion of the first and second racks 82, 84. In the illustrated embodiment, the first and second racks 82, 84 are disposed at opposite ends of the pinion, such that they move in opposite crosswise directions toward and away from one another with respect to the longitudinal axis 22. It should therefore be noted that the driving force that rotationally motivates the pinion 86 may be provided from a variety of sources in lieu of or in addition to the motor 40. For example, the motor 40 may be an electric motor, such as a stepper motor, a DC motor, and the like. Furthermore, other drive mechanisms for motivating the grippers 48, 50, 52, and 54 are also contemplated herein, such as compressed air drives, hydraulic drives, and so on.

To motivate the hose retrieval mechanism 32 along the longitudinal axis 22, as noted above, the motor 62 drives the frame 57 along the frame 18. More specifically, the motor 62 causes linear motion of the base 80, which is movingly coupled to the frame 18. A belt, chain, or direct drive may be coupled to the base 80 to produce the linear motion. The linear motion of the base 80, which is part of the frame 57, causes the hose retrieval mechanism 32 to be moved along the longitudinal axis 22 to retrieve a portion of the flexible hose 12 along the rods 20. Again, the movement of the flexible hose 12 along the rods 20 is facilitated by the friction-reducing bearings 66 disposed on the rods 20 and/or the elongate connectors 68. In certain embodiments, the flexible hose 12 may be at least partially inflated by PCA provided from the AC system 14 through the air duct 30 to facilitate the retrieval and transfer.

Moving now to FIG. 3, a front view illustration of the hose retrieval mechanism 32 of the retrieval system 10 of FIGS. 1 and 2 is provided wherein the grippers 48, 50, 52, and 54 are disposed in an open or released position. More specifically, FIG. 3 illustrates the arrangement of the hose retrieval drive assembly 56 and its relation to the retrieval mechanism frame 57 and first and second hose gripper assemblies 34, 36, the rods 20 and friction reducing bearings 66, and the first, second, third, and fourth grippers 48, 50, 52, and 54. The flexible hose 12 is illustrated schematically as disposed over the friction reducing bearings 66 coupled to the rods 20 and the elongate connectors 68. In the illustrated embodiment, the system 10 is illustrated as including 12 friction reducing bearings 66. However, it should be noted that the system 10 may include any number of bearings 66 (e.g., between 2 and 24). Further, the illustrated embodiment is depicted as including 6 cantilevered support rods 20. However, the system 10 may include any number of rods 20, e.g., 2 to 20.

Additionally, the flexible hose 12 is situated between the first and second grippers 48, 50 and the third and fourth grippers 52, 54 with respect to a first crosswise axis 100 relative to the longitudinal axis 22. With respect to the first hose gripper assembly 34, the first and second grippers 48, 50 are illustrated as having respective first and second bases 102, 104 that are coupled to the first and second racks 82, 84 of the first rack and pinion gear system 44 via first and second arms 106, 108. Further, the first and second grippers 48, 50 include respective first and second primary protrusions 110, 112 that extend towards each along a second crosswise axis 114 relative to the longitudinal axis 22. Likewise, the third and fourth grippers 52, 54 of the second hose gripper assembly 36 include respective third and fourth bases 116, 118 that are coupled to respective third and fourth arms 120, 122. In a similar manner to the first hose gripper assembly 34, the third and fourth arms 120, 122 are drivingly coupled to respective third and fourth racks 124, 126 of the second rack and pinion gear system 46. The third and fourth grippers 52, 54 also include respective third and fourth primary projections 128, 130 that extend from their respective bases 116, 118 towards each other along the second crosswise axis 114.

Figure 4:
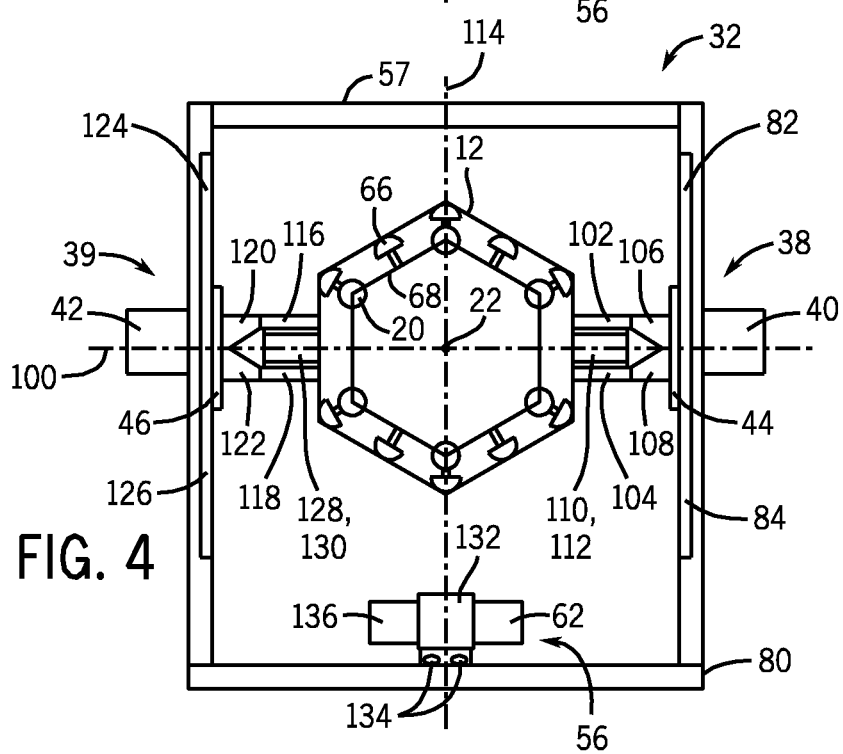
FIG. 4 is a front view of an embodiment of the hose retrieval system of FIGS. 1 and 2, illustrating the grippers in a closed position relative to one another.

In operation of the depicted embodiment, the first and second motors 40, 42 cause the first and second rack and pinion gear systems 44, 46 to begin to move. The resultant movements of the first and second racks 82, 84 cause the first and second grippers 48, 50, and, thus, the first and second primary protrusions 110, 112 to move towards one another along the second crosswise axis 114. Likewise, the movements of the third and fourth racks 124, 126 cause the third and fourth grippers 52, 54 and, thus, the third and fourth primary protrusions 128, 130 to move towards one another along the second crosswise axis 114. Once the primary protrusions 110, 112, 128, and 130 have engaged, bent, and captured the flexible hose 12, which is depicted in FIG. 4 and described in further detail below, the hose retrieval mechanism 32 may move along a beam 132. The beam 132 is supported by the frame 18 of the system 10 depicted in FIGS. 1 and 2, and includes a rail mechanism 134 that allows the base 80 and, thus, the retrieval mechanism 32 to be guided along the longitudinal axis 22 while in motion. For example, each rail mechanism 134 extends lengthwise along the axis 22, and includes an I-beam disposed in a slot. The illustrated rail mechanism 134 includes a pair of I-beams coupled to the base 80 and a mating slot coupled to the beam 132. This rail mechanism 134 guides the beam 132 to translate along the axis 22. Depending on a number of factors, including the size of the system 10, the number of retrieval mechanisms 32, and so on, at least a second motor 136 in addition to the motor 62 may be provided for the hose retrieval drive assembly 56.

While FIG. 3 depicts the hose retrieval mechanism 32 having the first and second gripper assemblies 34, 36 in an open or retracted position, FIG. 4 depicts a front view of the hose retrieval mechanism 32 in a closed or capture position. As illustrated, the first gripper assembly 34 has the first and second grippers 48, 50 in a closed position relative to one another, wherein their respective first and second primary protrusions 110, 112 are overlapping with each other to bend and capture a portion of the flexible hose 12. Likewise, the second gripper assembly 36 has the third and fourth grippers 52, 54 in a closed relationship to one another, wherein their respective third and fourth primary protrusions 128, 130 are overlapping with each other to bend and capture a portion of the flexible hose 12. Additionally, the first and second bases 106, 108 of the first and second grippers 48, 50 partially overlap in the closed, transfer, or engaged position, as do the third and fourth bases 120, 122 of the third and fourth grippers 52, 54. The first, second, third, and fourth grippers 48, 50, 52, and 54 may therefore approximate an L shape, wherein the primary and any other protrusions thereof may be considered fingers that inter-digitate with one another when in closed form due to their lateral offset.

Once the first and second hose gripper assemblies 34, 36 are in their closed or retrieval positions, they allow the hose retrieval mechanism 32 to move the flexible hose 12 horizontally along the rods 20 while a forward portion of the flexible hose 12 is supported by the friction reducing bearings 66. It should be noted that the friction reducing bearings 66 do not change position, and two of the friction reducing bearings 66 extending along the first crosswise axis 100 have been omitted for clarity. Again, as the flexible hose 12 is moved along the rods 20, the hose becomes longitudinally compacted, which allows the hose 12 to be stored at a length substantially shorter than its extended length. Furthermore, the compacted hose 12 remains on the rods 20, thereby facilitating later deployment of the hose 12.

Figure 5:
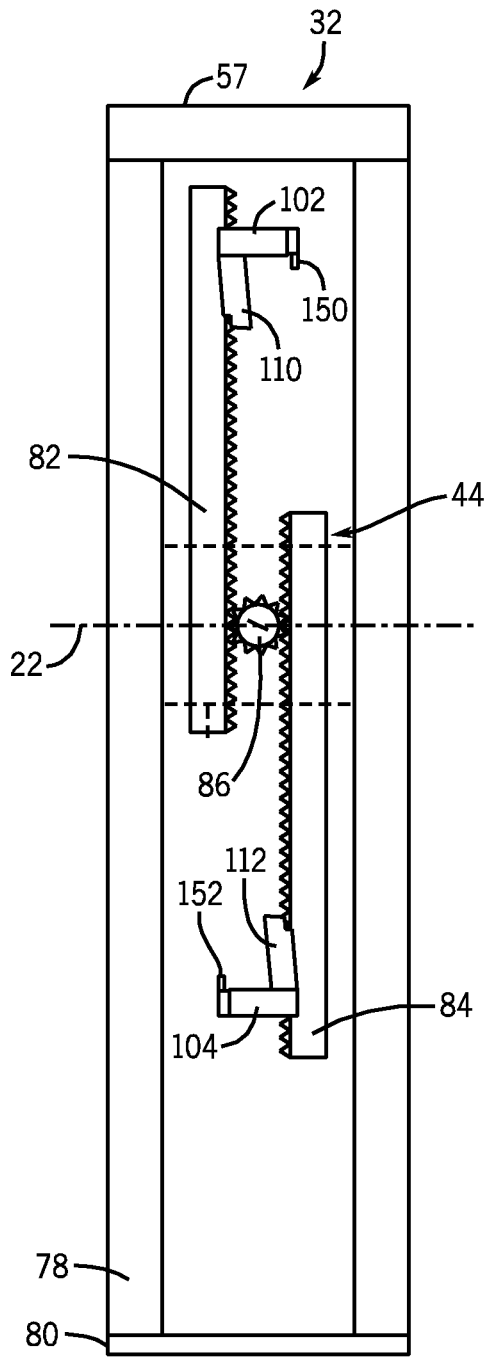
FIG. 5 is a partial schematic side view of one of the hose gripper assemblies of FIGS. 1-4, illustrating the grippers offset from one another along opposite racks in an open position.
Figure 6:
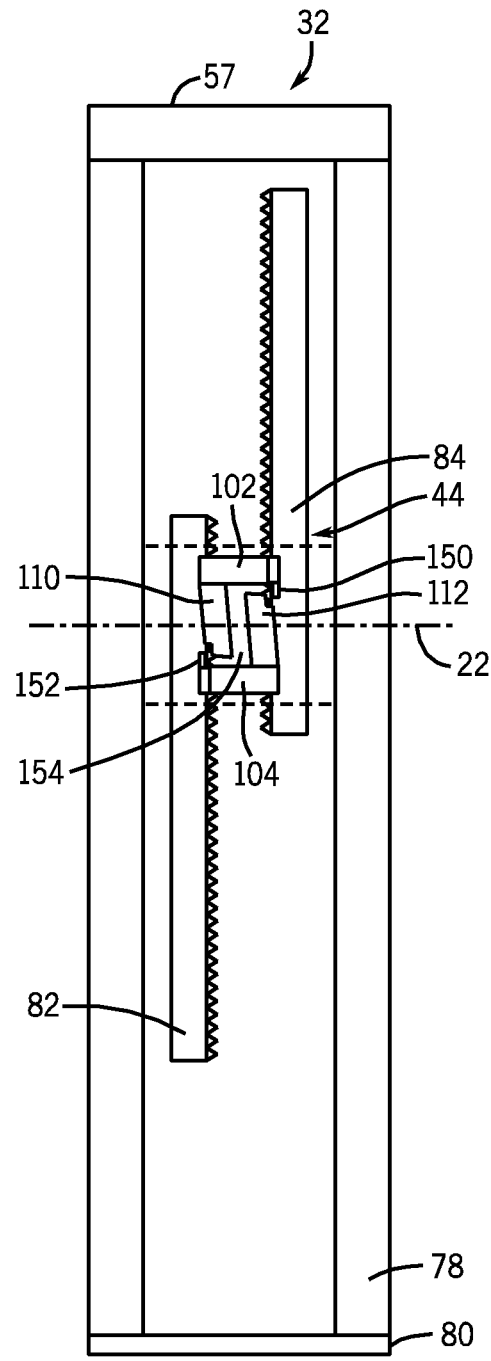
FIG. 6 is a partial schematic side view of one of the hose gripper assemblies of FIGS. 1-4, illustrating the grippers offset from one another along opposite racks in a closed position.

FIGS. 5 and 6 provide close-up side views of the retrieval mechanism 32 corresponding to the same open and closed positions depicted in FIGS. 3 and 4, respectively. Specifically, in FIG. 5, the first hose gripper assembly 32 is depicted as having the first and second grippers 48, 50 in an open position with respect to one another. Additionally, the first and second grippers 48, 50 and their design may be further appreciated with reference to the illustrated embodiment. As noted above, the first and second grippers 48, 50 include respective first and second bases 102, 104 and respective first and second primary protrusions 110, 112 extending towards each other along the second crosswise axis 114 with respect to the longitudinal axis 22. The first and second grippers 48, 50 may be constructed from any material suitable for the uses disclosed herein. As an example, the first and second bases 102, 104 may be constructed from metal or plastic-containing materials, such as steel, aluminum, brass, zinc, metal alloys, carbon fiber, elastomer-containing plastics (e.g., high impact polystyrenes and/or rubbers), and so forth. Indeed, the primary protrusions 110, 112 may also be constructed from such materials. In addition to the first and second primary protrusions 110, 112, the first and second grippers 48, 50 also include respective first and second auxiliary protrusions 150, 152, which also may be constructed from the materials listed above. The first and second auxiliary protrusions 150, 152 may aid in increasing at least the frictional force applied to the flexible hose 12, which may be advantageous for allowing the retrieval mechanism 32 to move the hose 12 from one side of the hose retrieval system 10 another (i.e., from the aircraft side 24 to the PCA origin side 26).

The retrieval mechanism 32, as noted above, includes the base 80 and the leg 78 that supports the rack and pinion system 44. The rack and pinion system 44 is driven by the motor 40 of FIGS. 1-4, which causes the first rack 82 to lower while the second rack 84 is raised and vice versa, though it should be noted that other mechanisms capable of providing crosswise movement are also contemplated herein. This lowering and raising is performed until the first primary protrusion 110 overlaps with the second primary protrusion 112 with respect to the longitudinal axis 22. Additionally, the first auxiliary protrusion 150 overlaps with the second primary protrusion 112 while the second auxiliary protrusion 152 overlaps with the first primary protrusion 110. Such an embodiment where the protrusions of the first and second grippers 48 and 50 overlap is illustrated in FIG. 6.

As noted above, the first primary protrusion 110 overlaps with the second primary protrusion 112 and the second auxiliary protrusion 152 with respect to the longitudinal axis 22, and the second primary protrusion 112 overlaps with the first primary protrusion 110 and the first auxiliary protrusion 150 with respect to the longitudinal axis 22. The overlapping of the first and second grippers 48 and 50 forms a bending gap 154, which is maintained while the retrieval mechanism 32 captures and moves the flexible hose 12. For example, the bending gap 154 is oriented at least substantially crosswise to the axis 22, such that material of the flexible hose 12 is captured in a bent or twisted orientation crosswise to the axis 22.

The arrangement of the hose 12, the first and second grippers 48, 50, and the bending gap 154 may be appreciated with respect to FIG. 7, which is a side view illustration of a portion of the hose 12 captured by the first and second grippers 48, 50 and disposed within the bending gap 154. According to the present embodiments, the portion of the hose 12 that is bent and captured for retrieval may be referred to as a capture or retrieval region 156 of the hose 12. The first and second grippers 48, 50 may therefore be considered as disposed on opposite sides of the retrieval region 156 of the hose 12 along the second crosswise axis 114 and with respect to the longitudinal axis 22 of FIGS. 3-4. Likewise, the third and fourth grippers 52, 54 of FIGS. 3-4 may be considered to be disposed on opposite sides of the retrieval region 156 of the hose 12 along the first crosswise axis 100 and with respect to the longitudinal axis 22 of FIGS. 3-4.

The bending gap 154 that allows the flexible hose 12 to be moved by the hose retrieval mechanism 32 may have a zigzagging shape (e.g., an L-shape, Z-shape, S-shape, or W-shape), the size of which may be controlled by the extents of the first and second primary protrusions 110, 112, the extents of the first and second bases 102, 104, and the number and extents of any auxiliary protrusions that may be present. Regardless of the shape of the gap 154, the gap 154 is at least substantially oriented crosswise to the axis 22. For example, the gap 154 may extend approximately 50 to 100 percent, 75 to 95 percent, or 80 to 90 percent crosswise to the axis 22. In one embodiment, the first and second grippers 48, 50 may each consist essentially of a single primary protrusion and a single auxiliary protrusion, though more than one primary protrusion and less or more than one auxiliary protrusion are also contemplated herein, as noted above. For example, the first and second grippers 48, 50 have a general L-shape. Therefore, as they come together at an offset, the resulting bending gap 154 has a Z-shape, wherein the length of the Z (i.e., the portion of the Z generally along the second crosswise axis 114) is between approximately 0% and 300% greater in size than the widths (i.e., each of the portions of the Z that are generally along the longitudinal axis 22). For example, the length-to-width size ratio of the Z may be between approximately 1:1 to approximately 3:1 or more (e.g., 1:1, 1.5:1, 2:1, 2.5:1, 3:1, or greater). The size of the Z shape may be controlled by the size of the protrusions. For example, the sizes of the first and second primary protrusions 110, 112 may be larger than the sizes of the first and second auxiliary protrusions 150, 152, such that their lengths are at least about 10% greater in size, such as about 10%, 20%, 30%, 50%, 100%, 200%, 300%, 400%, or 500% or greater in size, and their widths are at least about 10%, 20%, 30%, 50%, 100%, 200%, 300%, 400%, or 500% or greater in size.

In the illustrated embodiment, the bending gap 154 includes a first crosswise gap 157 that is formed between the first and second primary protrusions 110, 112. Additionally, the bending gap 154 includes a first longitudinal gap 158 that is formed between the first primary protrusion 110 and the second base 104, and a second longitudinal gap 159 that is formed between the second primary protrusion 112 and the first base 102. As noted above, in a general sense, the bending gap 154 causes the flexible hose 12 to interweave or zigzag between the first and second grippers 48, 50, which increases at least the frictional force between the grippers 48, 50 and the flexible hose 12. This increased frictional force allows the hose retrieval mechanism 32 to move the flexible hose 12 with minimal to no slippage. This interweaving also may be described as a twisting or binding action, which holds the region 156 of the hose 12 without directly clamping the grippers 48, 50 onto the region 156 (i.e., without completely closing the gap 154 to compress the region 156). As illustrated in FIG. 7, a considerable amount of space remains in the gap 154 around the material of the flexible hose 12, thereby reducing the possibility of wear and damage caused by complete closure of the grippers 48, 50. Therefore, it should be noted that although certain embodiments are presented herein for securing the flexible hose 12, that the general act of securing the hose 12 with little to no compressive force on the hose 12 is contemplated herein. Indeed, any device capable of providing a frictional force to the hose 12 for horizontal movement is presently contemplated.

To further decrease the probability of hose slippage, as noted above, the first and second auxiliary protrusions 150, 152 are provided. More specifically, the first auxiliary protrusion 150 extends from the first base 102 on a side opposite from the first primary protrusion 110 along the longitudinal axis 22 and towards the second base 104, and the second auxiliary protrusion 152 extends from the second base 154 on a side opposite the second primary protrusion 112 along the longitudinal axis and towards the first base 102. In a manner similar to the overlap of the first and second primary protrusions 110, 112, the overlap of the first primary protrusion 110 with the second auxiliary protrusion 152 forms a second crosswise gap 160 that is oriented substantially parallel with the first crosswise gap 157. In a similar manner, the overlap of the second primary protrusion 112 with the first auxiliary protrusion 150 forms a third crosswise gap 159. As the sizes of the first and second primary protrusions 110, 112 are larger than the sizes of the first and second auxiliary protrusions 150, 152 (e.g., at least about 10% greater in size, such as about 10%, 20%, 30%, 50%, 100%, 200%, 300%, 400%, or 500% or greater in size), the first crosswise gap 157 may also be larger than the second and third crosswise gaps 160, 162. For example, the first crosswise gap 157 may be at least about 50% greater in size compared to the second and third crosswise gaps 160, 162. For example, in some embodiments, the first crosswise gap 157 may be approximately 10%, 20%, 30%, 50%, 100%, 200%, 300%, 400%, or 500% or larger than the second and third crosswise gaps 160, 162. The addition of the second and third crosswise gaps 160, 162 increases the amount of the flexible hose 12 that is bent and captured for transport. That is, a larger portion of the flexible hose 12 may be included within the hose retrieval region 156.

In addition to the size of the first and second primary protrusions 110, 112, the retaining force (i.e., the frictional force placed upon the flexible hose 12) may also vary with changes in the angle at which the first and second primary protrusions 110, 112 extend from the first and second bases 102, 104. For example, in some embodiments, the first and second primary protrusions 110, 112, as well as the second and third primary protrusions 128, 130 depicted in FIGS. 3-4, may extend from their respective bases at acute angles greater than 45 degrees, such as about 45, 50, 60, 70, 80 or 85 degrees. In other embodiments, the primary protrusions 110, 112, 128, and 130 may be disposed at approximate right angles (e.g., 90 degrees) from their respective bases. In varying these angles, the angle of bend of the flexible hose 12 while disposed in the bending gap 156 may change. In one embodiment, the angle of bend of the flexible hose 12 may have a direct effect on the amount of frictional force applied to the flexible hose 12 for transfer. According to the present embodiments, the angle of bend of the flexible hose 12 may be approximately equal to or proportional to the angle at which the protrusions extend from their respective bases. Therefore, the size, shape, and extent of the protrusions of the first and second grippers 48, 50, and thus the size, shape, and extent of the crosswise gaps, may have a direct effect on the ability of the hose retrieval mechanism 32 to properly bend, capture, and retrieval the flexible hose 12.

The size and shape of the first, second, and third crosswise gaps 157, 160, and 162 may depend on a number of factors, including the size of the protrusions forming the gaps, the angle at which each protrusion extends from the first and second bases 102, 104, and so on. According to present embodiments, varying the size and/or angle of the first and/or second primary protrusions 110, 112 and/or the size and/or angles of the first and/or second auxiliary protrusions 150, 152 may vary their respective gap sizes, shapes (i.e., angles), and so on. Such variance in the first, second, and/or third crosswise gaps 157, 160, and/or 162 may allow the hose retrieval system 10 (i.e. the hose retrieval mechanism 32) to accommodate a variety of hoses having different shapes, sizes, or different materials. For example, an operator may simply interchange the primary 110, 112 and/or auxiliary 150, 152 protrusions rather than interchanging the entire retrieval mechanism 32, adjusting other settings of the equipment (e.g., the motor power and/or displacement), and so on. Furthermore, the interchangeability of the primary 110, 112 and/or auxiliary 150, 152 protrusions may allow the use of the hose retrieval system 10 in a variety of conditions where differing levels of friction may be required for hose transfer, such as in snowy, rainy, or icy weather, in dry or windy conditions, and so on.

It should be noted that in addition to the size, shape, and extents of the protrusions, that the gaps disclosed herein may also be controlled by the controller 64 of FIG. 1 and features of motors 40 and 42. For example, in embodiments where the motors 40, 42 are stepper motors, they may be configured to stop at least one or more steps prior to complete closure to define the gap 154. In this way, the motors 40, 42 may provide little to no compressive force to the material of the flexible hose 12.

FIGS. 8-10 provide illustrative examples of such variance. Specifically, FIG. 8 depicts primary protrusions as having a smaller angle of protrusion away from their respective bases compared to the embodiment of FIG. 7. FIG. 9 depicts primary protrusions disposed at approximate right angles from their respective bases, and FIG. 10 depicts the same angular arrangement as FIG. 9, except that each gripper has more than one auxiliary protrusion.

In FIG. 8, the first gripper 48 is illustrated as having a first primary protrusion 166 extending from the first base 102 at a first angle 168, which is an acute angle greater than 45 degrees in the illustrated embodiment. For example, the first angle 168 may be between approximately 45 degrees and 80 degrees in the embodiment depicted in FIG. 8. Similarly, a second primary protrusion 170 is provided that extends from the second base 104 at a second angle 172. In the illustrated embodiment, the first and second angles 168, 172 are approximately the same. However, it should be noted that in other embodiments, the angles may be different, such that the first angle 168 is smaller or larger than the second angle 172. It should be noted that in addition to the angles 168, 172 of the first and second primary protrusions 166, 170 of FIG. 8, the angles of the first and second auxiliary protrusions 150, 152 may vary as well. In some embodiments, the angles of the first and second auxiliary protrusions 150, 152 may be substantially the same as the angles 168, 172 of the first and second primary protrusions 166, 170, or may be different than the angles 168, 172.

As noted above, the variance of the first and second angles 168, 172, as well as the angles of the first and second auxiliary protrusions 150, 152 may affect the size of a first crosswise gap 174 formed between the first and second primary protrusions 166, 170, a second crosswise gap 176 formed between the first primary protrusion 166 and the first auxiliary protrusion 152, and a third crosswise gap 178 formed between the second primary protrusion 170 and the first auxiliary protrusion 178. More specifically, the first, second, and third crosswise gaps 174, 176, and 178 may vary in shape (i.e., angles) and size as the first and second angles 168, 172 are varied with respect to one another and also with respect to the first and second auxiliary protrusions 150, 152.

Moving now to FIG. 9, an embodiment of the first and second grippers 48, 50 is provided wherein a first primary protrusion 180 is disposed at about a right angle (e.g., approximately 90 degrees) from the first base 102. That is, the first angle 166 is approximately a right angle. Similarly, a second primary protrusion 182 is disposed at about a right angle (e.g., approximately 90 degrees) from the second base 104. That is, the second angle 168 is approximately a right angle. Therefore, a first crosswise gap 184 formed between the first and second primary protrusions 180, 182 has a substantially rectangular shape.

In addition to the first and second primary protrusions 180, 182 extending in a substantially straight perpendicular direction away from their respective first and second bases 102, 104, the grippers 48, 50 include a first auxiliary protrusion 186 and a second auxiliary protrusion 188 extending away from their respective first and second bases 102, 104 at approximate right angles (e.g., approximately 90 degrees). In this way, a second crosswise gap 190 and a third crosswise gap 192 are formed that are also substantially rectangular in shape. In such an embodiment, the bending gap formed by interconnection between the first, second, and third crosswise gaps 184 190, and 192 may consist essentially of a series of L-shaped paths that are substantially maintained during retrieval of the flexible hose 12.

FIG. 10 illustrates an embodiment of the first and second grippers 48, 50, wherein the gripper 48 includes a first primary protrusion 200 disposed at about a right angle (e.g., approximately 90 degrees) from the first base 102, and the protrusion 200 has indentations to accommodate two auxiliary protrusions. The gripper 50 also includes a second primary protrusion 202 disposed at about a right angle (e.g., approximately 90 degrees) from the second base 104, and the protrusion 202 also has indentations to accommodate two auxiliary protrusions. Similar to the embodiment of FIG. 9, a first crosswise gap with a substantially rectangular shape is formed between the first and second primary protrusions 200, 202.

In addition to the first and second primary protrusions 200, 202 extending in a substantially straight perpendicular direction away from their respective first and second bases 102, 104, the grippers 48, 50 include a first auxiliary protrusion 206 and a second auxiliary protrusion 208 extending away from their respective first and second bases 102, 104 at approximate right angles (e.g., approximately 90 degrees). The illustrated embodiment also provides a third auxiliary protrusion 210 and a fourth auxiliary protrusion 212 extending from the first and second bases 102, 104, respectively.

In a similar manner to the illustrated embodiment of FIG. 9, a first generally rectangular crosswise gap 204 is formed between the first and second primary protrusions 200, 202. However, the embodiment of FIG. 10 also includes a second crosswise gap 214 and a third crosswise gap 216 formed between the first primary protrusion 200, the second and fourth auxiliary protrusions 208, 212, and the second base 104. The illustrated embodiment further includes a fourth crosswise gap 218 and a fifth crosswise gap 222 formed between the second primary protrusion 202, the first and third auxiliary protrusions 206, 210, and the first base 102. In one embodiment, the increased number of crosswise gaps may allow a higher level of retention of the flexible hose 12 using a substantially reduced level of compressive force compared to other methods, such as pinching.

Figure 11:
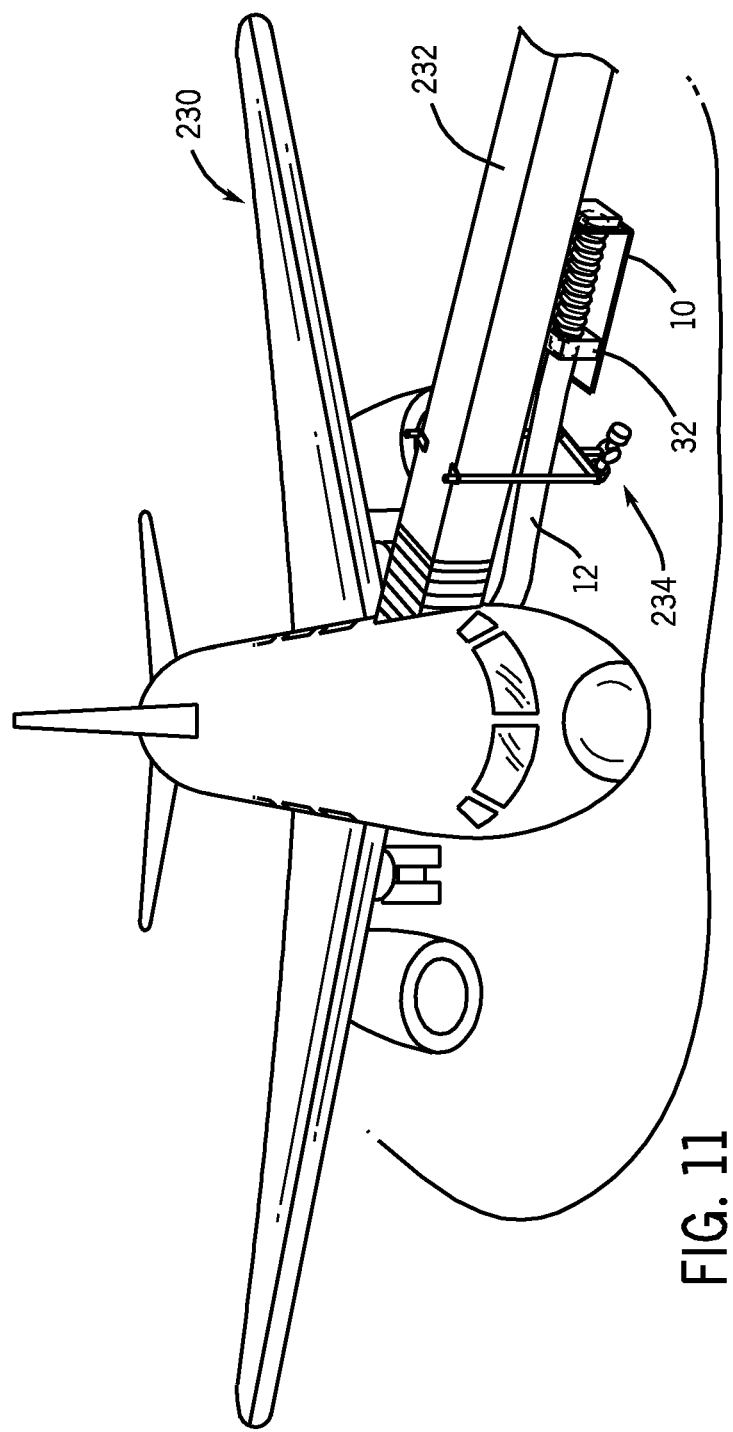
FIG. 11 is a schematic view of an embodiment of a hose retrieval system utilized in the provision of preconditioned air to an aircraft, illustrating the hose retrieval system as attached to a boarding bridge.

While the present embodiments provide a hose retrieval system 10 that may be applicable to any number of industries such as textiles, portable cooling and storage units, and so on, an embodiment of one implementation is illustrated in FIG. 11, wherein the hose retrieval system 10 is utilized in the provision of PCA to an aircraft 230. Specifically, the hose retrieval system 10 is illustrated as attached to a boarding bridge 232 that allows passengers to enter the aircraft 230 from a waiting area, such as an airport terminal. In use, an operator may pull the flexible hose 12 out of the retrieval system 10 and attach it to the aircraft 230. To allow facile connection, the hose retrieval system 10 may be provided on a portion of the boarding bridge 232 that is proximate the area where the hose 12 will be connected to the aircraft 230. For example, in the illustrated embodiment, the hose retrieval system 10 is disposed on an underside of the boarding bridge 232 behind a bogie wheel assembly 234 with respect to the aircraft 230. However, other areas of placement are also contemplated, such as attached to the side of the boarding bridge 232, attachment to a separate motorized vehicle, or attached to casters or wheels that allow the hose retrieval system 10 to be utilized as a standalone piece of equipment. In other arrangements, the hose retrieval system 10 may be secured to the bogie wheel assembly 234, or in front of the bogie wheel assembly 234. For example, the system 10 may be fitted with casters or similar wheel mechanisms and secured to the bogie wheel assembly 234, which allows the system 10 to be moved in concert with the boarding bridge 232.

After the PCA has been provided to the aircraft 230, an operator may signal to the hose retrieval system 10 that the hose 12 has been disconnected and is ready for retrieval, either by providing a user input, or via sensors that sense connection between the aircraft and the hose 12. The hose retrieval mechanism 32 may then begin to bend, capture, and retrieve the hose 12 until it has been substantially fully retrieved and compacted for storage within the hose retrieval system 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
an aircraft hose retrieval system, comprising:
a frame comprising a longitudinal axis;
a first hose gripper assembly, comprising:
a first gripper coupled to a first notched rack, the first gripper comprising a first base and a first primary protrusion;
a second gripper coupled to a second notched rack, the second gripper comprising a second base and a second primary protrusion, wherein the first and second grippers and the first and second notched racks are configured to move in opposite crosswise directions relative to the longitudinal axis, the first primary protrusion extends from the first base toward the second base, the second primary protrusion extends from the second base toward the first base, the first and second primary protrusions are offset from one another along the longitudinal axis, and the first and second primary protrusions are configured to overlap one another to bend and capture a first portion of an aircraft hose.

2. The system of claim 1, comprising a second hose gripper assembly, comprising:
a third gripper comprising a third base and a third primary protrusion;
a fourth gripper comprising a fourth base and a fourth primary protrusion, wherein the third and fourth grippers are configured to move in opposite crosswise directions relative to the longitudinal axis, the third primary protrusion extends from the third base toward the fourth base, the fourth primary protrusion extends from the fourth base toward the third base, the third and fourth primary protrusions are offset from one another along the longitudinal axis, and the third and fourth primary protrusions are configured to overlap one another to bend and capture a second portion of the aircraft hose.

3. The system of claim 2, wherein the first and second hose gripper assemblies are disposed on opposite first and second sides of a hose retrieval region along the longitudinal axis.

4. The system of claim 3, comprising a first leg supporting a first gripper drive assembly coupled to the first hose gripper assembly on the first side, and a second leg supporting a second gripper drive assembly coupled to the second hose gripper assembly on the second side.

5. The system of claim 1, wherein the first gripper comprises a first auxiliary protrusion and the second gripper comprises a second auxiliary protrusion, the first auxiliary protrusion extends from the first base toward the second base, the second auxiliary protrusion extends from the second base toward the first base, the first and second auxiliary protrusions are offset from one another along the longitudinal axis, the first auxiliary protrusion and the second primary protrusion are configured to overlap one another to bend and capture the first portion of the aircraft hose, and the second auxiliary protrusion and the first primary protrusion are configured to overlap one another to bend and capture the first portion of the aircraft hose.

6. The system of claim 5, wherein the first and second primary protrusions are substantially larger than the first and second auxiliary protrusions.

7. The system of claim 5, wherein the first and second primary protrusions are configured to overlap one another with a first crosswise gap, the first auxiliary protrusion and the second primary protrusion are configured to overlap one another with a second crosswise gap, the second auxiliary protrusion and the first primary protrusion are configured to overlap one another with a third crosswise gap, and the first hose gripper assembly is configured to maintain the first, second, and third crosswise gaps during retrieval of the aircraft hose.

8. The system of claim 7, wherein the first crosswise gap is larger than the second and third crosswise gaps.

9. The system of claim 7, wherein the first gripper defines a first L-shaped structure having the first base, the first primary protrusion, and the first auxiliary protrusion, wherein the second gripper defines a second L-shaped structure having the second base, the second primary protrusion, and the second auxiliary protrusion.

10. The system of claim 9, wherein the first and second L-shaped structures are configured to overlap one another to define a Z-shaped gap to hold the first portion of the aircraft hose.

11. The system of claim 1, comprising a first gripper drive assembly configured to move the first and second grippers and the first and second notched racks in the opposite crosswise directions relative to the longitudinal axis, and a hose retrieval drive assembly configured to move the first hose gripper assembly along the longitudinal axis to retrieval the aircraft hose.

12. The system of claim 1, comprising the aircraft hose.

13. A system, comprising:
   a fabric hose retrieval system, comprising:
      a fabric hose extending along a longitudinal axis; and
      a first hose gripper assembly disposed on a first side of the fabric hose, wherein the first hose gripper assembly comprises a pair of first grippers each coupled to a toothed rack and at least partially offset from one another along the longitudinal axis, the first grippers and the toothed racks are configured to move crosswise relative to the longitudinal axis between a first open position and a first closed position, wherein the first grippers overlap one another to define a first bending gap in the first closed position.

14. The system of claim 13, wherein the first bending gap comprises a Z-shaped bending gap.

15. The system of claim 13, wherein each of the first grippers comprises a first base supporting a first primary protrusion offset from a first auxiliary protrusion, and the first primary protrusion is larger than the first auxiliary protrusion.

16. The system of claim 15, wherein the first primary protrusion is at least 50 percent larger than the first auxiliary protrusion.

17. The system of claim 15, wherein each first gripper has the first primary protrusion disposed at a first acute angle relative to the first base, and the first acute angle is less than 90 degrees and greater than or equal to approximately 45 degrees.

18. A system, comprising:
   a hose retrieval system, comprising:
      a first hose gripper assembly comprising a pair of first grippers configured to move between a first open position and a first closed position in opposite crosswise directions relative to a longitudinal axis of a hose, wherein each first gripper comprises a first base and a first protrusion intersecting at a first angle to form a first L-shaped structure, and the first L-shaped structures are configured to overlap one another to define a first bending gap in the first closed position.

19. The system of claim 18, comprising a second hose gripper assembly comprising a pair of second grippers configured to move between a second open position and a second closed position in opposite crosswise directions relative to the longitudinal axis of the hose, wherein each second gripper comprises a second base and a second protrusion intersecting at a second angle to form a second L-shaped structure, and the second L-shaped structures are configured to overlap one another to define a second bending gap in the second closed position.

20. The system of claim 18, wherein each first gripper comprises a second protrusion intersecting the first base at a first offset relative to the first protrusion, wherein the first protrusion is at least approximately 50 percent longer than the second finger.

* * * * *